(12) United States Patent
Lee et al.

(10) Patent No.: US 8,064,053 B2
(45) Date of Patent: Nov. 22, 2011

(54) 3-COLOR MULTIPLEX CARS SPECTROMETER

(75) Inventors: Jae Yong Lee, Cheongju-si (KR); Eun Seong Lee, Daejeon (KR); Dae Won Moon, Daejeon (KR)

(73) Assignee: Korea Research Institute of Standards and Science (KR)

( * ) Notice: Subject to any disclaimer, the term of this patent is extended or adjusted under 35 U.S.C. 154(b) by 327 days.

(21) Appl. No.: 12/318,373

(22) Filed: Dec. 29, 2008

(65) Prior Publication Data

US 2010/0020318 A1    Jan. 28, 2010

(30) Foreign Application Priority Data

Jul. 24, 2008  (KR) .................. 10-2008-0072452

(51) Int. Cl.
*G01J 3/44* (2006.01)
*G01N 21/65* (2006.01)
(52) U.S. Cl. ...................................................... 356/301
(58) Field of Classification Search .................. 356/300, 356/301; 372/25
See application file for complete search history.

(56) References Cited

U.S. PATENT DOCUMENTS

| 7,092,086 | B2 * | 8/2006 | Knebel | 356/301 |
| 7,403,282 | B2 * | 7/2008 | Silberberg et al. | 356/301 |
| 7,573,577 | B2 * | 8/2009 | Martinez | 356/451 |
| 7,586,618 | B2 * | 9/2009 | Marks et al. | 356/451 |
| 7,623,908 | B2 * | 11/2009 | Boppart et al. | 600/477 |
| 7,826,051 | B2 * | 11/2010 | Silberberg et al. | 356/301 |

* cited by examiner

*Primary Examiner* — Layla Lauchman
(74) *Attorney, Agent, or Firm* — Cantor Colburn LLP

(57) ABSTRACT

The present invention relates to a 3-color multiplex CARS spectrometer. In the 3-color multiplex CARS spectrometer, Raman resonance is achieved for multiple molecular vibrations of a sample by the combination of a short-wavelength pump beam generated by a broadband laser light source and a long-wavelength Stokes beam generated by a stable laser light source, and another short-wavelength laser beam having a narrow linewidth is then introduced separately to serve as a probe beam that interacts with the laser-driven sample, thereby generating CARS spectral signals whose wavelength components can be resolved. Accordingly, the 3-color multiplex CARS spectrometer solves problem of the conventional 2-color multiplex CARS spectroscopy in which the wavelength decomposition of CARS signals, necessary for high spectral resolution, is not possible with broadband pump light causing the CARS spectrum distortion.

8 Claims, 6 Drawing Sheets
(6 of 6 Drawing Sheet(s) Filed in Color)

(a) Wideband Stokes, Narrow Band Pump, Wideband Stokes CARS $\Delta\omega_{stk}$ $\omega_{stk}$, $\omega_{pmp}$, $\omega_{AS} = 2\omega_{pmp} - \omega_{stk}$ (b) Narrow Band Stokes, Wideband Pump, Wideband Pump CARS $\Delta\omega_{pmp}$ $\omega_{stk}$, $\omega_{pmp}$, $\omega_{AS} = (\omega_{pmp} - \omega_{stk}) + \omega'_{pmp}$ (c) Narrow Band Stokes, Wideband Pump, Narrow Band Probe, 3-Color Multiplex CARS $\Delta\omega_{pmp}$ $\omega_{stk}$, $\omega_{pmp}$, $\omega_{prb}$, $\omega_{AS} = (\omega_{pmp} - \omega_{stk}) + \omega_{prb}$

3-COLOR MULTIPLEX CARS SPECTROMETER

TECHNICAL FIELD

The present invention relates to a 3-color multiplex CARS spectrometer, and more particularly, to a 3-color multiplex CARS spectrometer, which performs a spectral analysis by focusing three laser beams of separated wavelength bands on an interior of a sample and obtaining a multiplex CARS spectral signal.

BACKGROUND ART

When observing an optically transparent microsamples including biological samples such as cells or tissues, there are some problems with a conventional optical imaging technique that it is very difficult to obtain clear morphological images for various intracellular organelles and substances in the sample and to measure spatial distribution of molecular species. This is because sufficient optical contrast can hardly be provided due to an insignificant difference between objects and background substances in the sample-light interaction. In other words, a specific microstructure to be observed in the sample or an extremely small quantity of substance is not distinguished from the background substances surrounding the circumference thereof.

To study biological phenomena and disease mechanisms in the cellular level by observing various metabolic substances and functioning intracellular organelles, an alternative optical imaging method has been proposed to overcome the limitations of general optical microscopes. Particularly, an optical technology for obtaining molecular images by detecting characteristic spectroscopic features unique to substances themselves has come into the spotlight. The Raman scattering spectroscopy is being widely used as a label-free method to analyze molecular vibrational fingerprints by making a specific molecule interact with a laser beam and allow for characteristic spectroscopic signals without help of molecule-selective markers. The Raman scattering spectroscopy is combined with an optical microscope system to obtain chemical images of microstructures in the sample.

Figure 1:
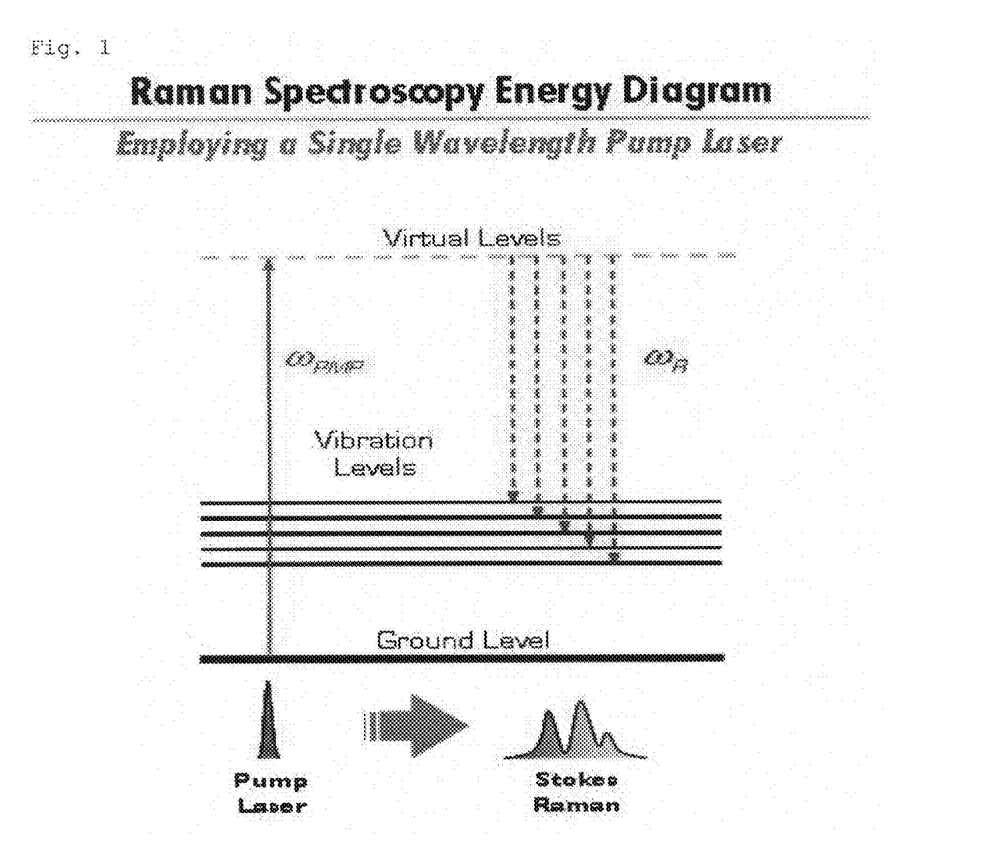
FIG. 1 is a schematic diagram of molecular vibrational transitions illustrating the principle of a spontaneous Raman scattering signal generation.

FIG. 1 is a schematic diagram of molecular vibrational transitions illustrating the principle of a spontaneous Raman scattering signal generation.

Pixel data constituting a molecular image in a Raman microscope consist of spontaneous Raman spectra generated by scanning a laser beam of a single predetermined wavelength onto a sample. Photons of an incident laser beam at a fixed wavelength that do not cause resonance with molecular vibrational modes, generate red-shifted Raman spectral signals through inelastic scattering. Here, the energy difference between the incident photons and the Raman scattered photons corresponds to the energy of vibrational modes of the substance. That is, the Raman spectra obtained by collecting laser beams scattered by the sample contain information on a specific molecular vibrational mode of substance constituting the sample.

The aforementioned Raman microscope has both practical advantages and fundamental limitations. Since a single wavelength cw light source can be used in the Raman microscope regardless of a molecular vibrational frequency, there is an advantage in that the requirement for the excitation laser light source in the configuration of the Raman microscope is not so demanding, and its operation is relatively simple. Further, a laser light source having a short wavelength in the visible or UV region is used, which allows for obtaining microscopic images with high spatial resolution. On the other hand, the intensity of a Raman scattering signal containing molecular information is extremely weak, which gives rise to a fundamental problem that it usually takes a long integration time to obtain a microscopic image. Particularly, when dynamics of living biological samples are observed or the excitation laser power cannot be intense enough due to the optical damage threshold of the sample, such disadvantage becomes more serious.

A microscope based on the coherent anti-Stokes Raman scattering (CARS) spectroscopy can be a good alternative for overcoming the limitations of the conventional Raman microscope, which can dramatically improve the detection sensitivity and the frame rate in the chemical imaging. The CARS microscope is similar to the conventional Raman microscope in that the Raman scattering mechanism is exploited in detecting molecular vibrations. While spontaneous Raman scattering that is a linear optical process is used in the conventional Raman microscope, the CARS microscope is designed to use a kind of four-wave mixing process, namely, CARS. In the four-wave mixing, a nonlinear optical signal is generated by allowing three incident laser beams to interact with a sample.

Figure 2:
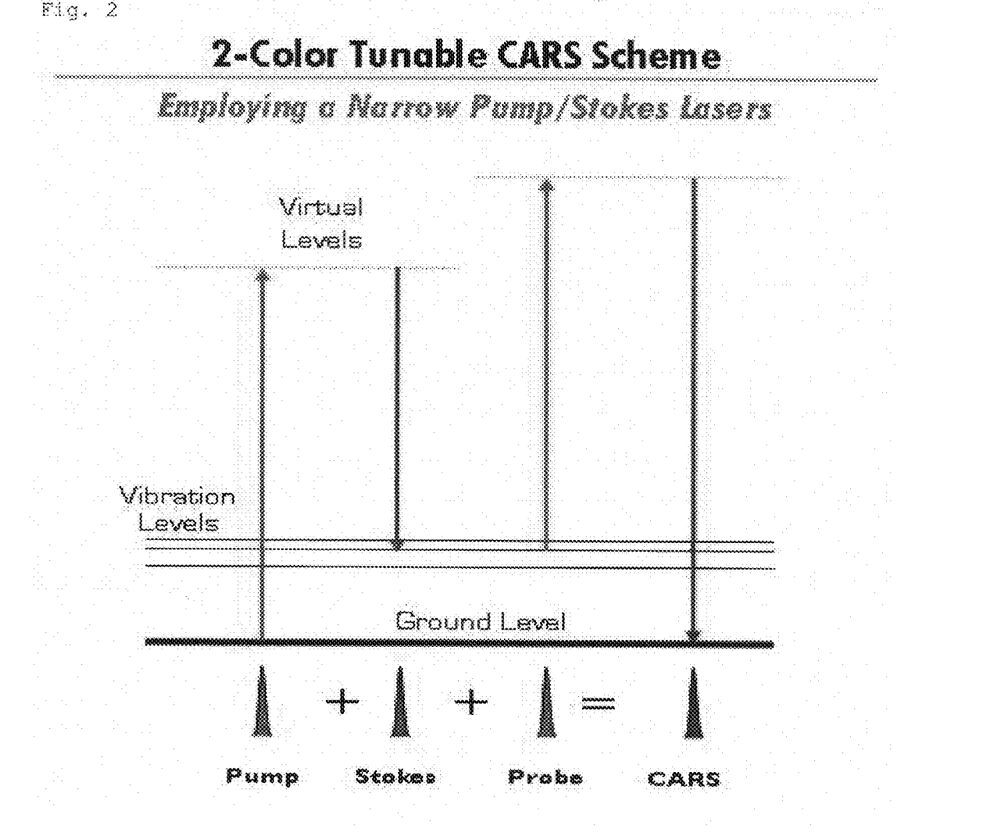
FIG. 2 is a schematic diagram of molecular vibrational transitions illustrating the principle of a nonlinear CARS spectral signal generation.

FIG. 2 is a schematic diagram of molecular vibrational transitions illustrating the principle of CARS process.

The principle of the CARS microscopy is as follows. When two laser beams (a pump beam and a Stokes beam) having a frequency difference tuned to a Raman shift of specific molecules are incident on a sample, a harmonic oscillation of the molecules is resonantly induced, according to the phase of the beat waveform. If a third laser beam (a probe beam) enters the sample and interacts with such vibrating molecules, a strong coherent signal beam is generated in a specific direction through anti-Stokes Raman scattering process in which the wavelength of the signal beam is shortened after the interaction. Such nonlinear optical signal can be precisely mapped on a sample space at a high speed, thereby resulting in CARS microscopic images.

The most important advantage of the CARS microscope is to obtain selective molecular vibrational images like the Raman microscope but to provide a very high sensitivity and a very high speed in the image data acquisition. Since the CARS generates a signal beam at least 10,000 times stronger than the spontaneous Raman scattering even under the intensity-limiting condition for incident lasers which does not cause damages to the sample, a high-quality image having a high signal-to-noise ratio can be rapidly acquired. Since the CARS is a four-wave mixing process resulting from a third-order nonlinear optical response of a substance, the CARS signal can be enhanced proportional to the cube of the intensity of incident laser beams, which allows for nondestructive 3-dimensional imaging of the interior of a sample with high spatial resolution like a confocal laser scanning microscope. Since the CARS phenomenon is an optical parametric conversion process as well, no laser energy is deposited on the sample after laser interaction, thereby preventing the sample from being thermally damaged by a laser beam.

However, CARS spectroscopy has a major disadvantage in practice that the molecular selectivity and signal-to-noise ratio can be degraded by the non-resonant contribution in the third-order nonlinear susceptibility irrespective of molecular vibrational characteristics. Another technical disadvantage of the CARS spectroscopy compared with the Raman spectroscopy using a single wavelength light source is that the CARS spectroscopy could record molecular vibrational spectra by changing the wavelength of any one of two incident laser beams (a pump beam and a Stokes beam). That is, a laser light source generating a pump beam or a Stokes beam should have fast and stable wavelength tuning capability. Up to now, a picosecond/femtosecond laser light source suitable for biomedical CARS images hardly satisfies the required condition.

Figure 3:
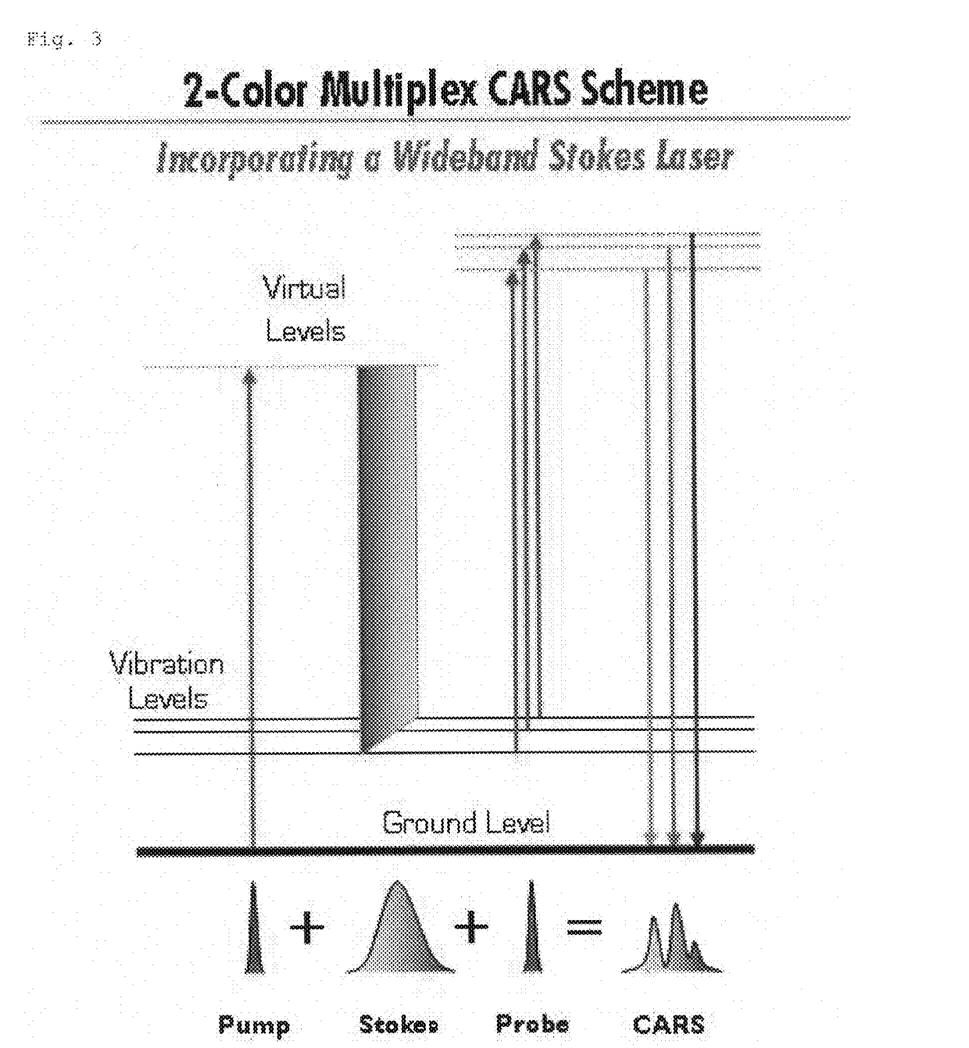
FIG. 3 is a schematic diagram of molecular vibrational transitions illustrating the principle of a 2-color multiplex CARS spectroscopy.
Figure 4:
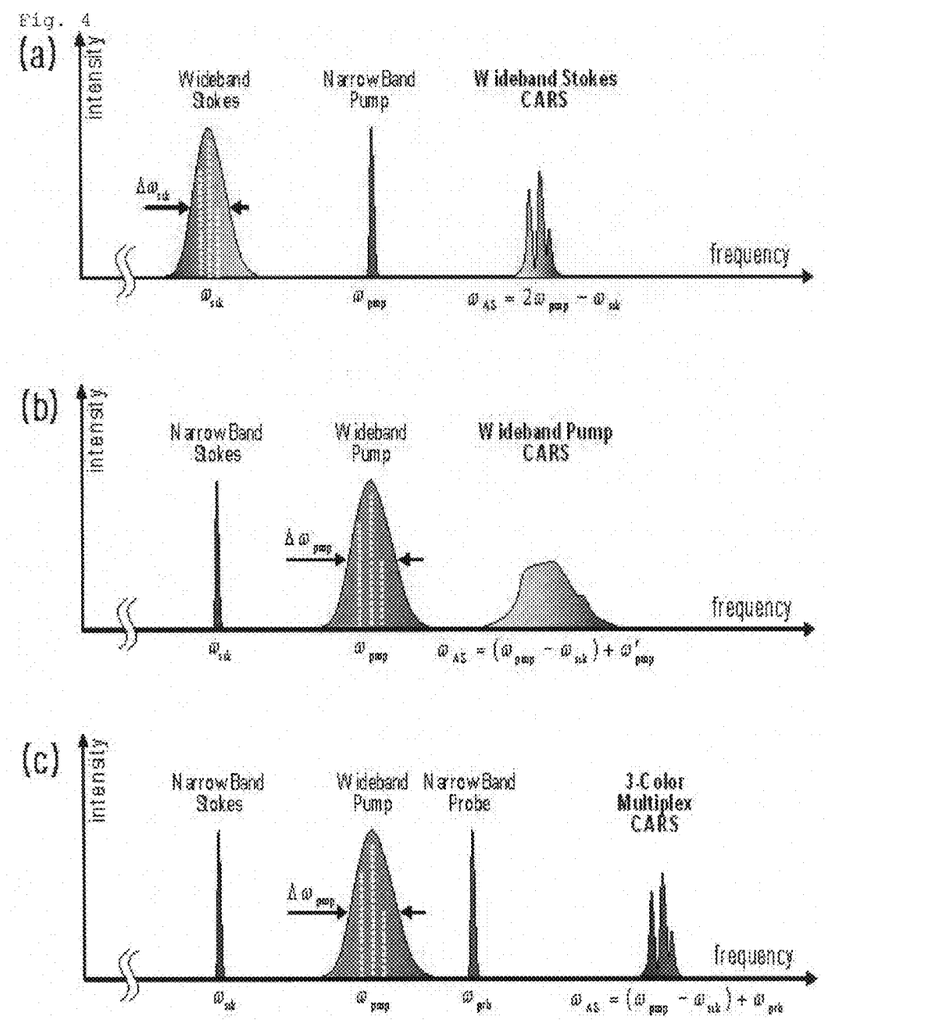
FIG. 4 is a schematic diagram illustrating the spectral feature obtained by a multiplex CARS spectroscopy.

FIG. 3 is a schematic diagram of molecular vibrational transitions illustrating the principle of a 2-color multiplex CARS spectroscopy, and FIG. 4 is a schematic diagram illustrating spectral characteristics obtained by a multiplex CARS spectroscopy.

A multiplex CARS scheme may be used as a practical CARS implementation method for obtaining a broadband molecular vibrational spectrum. The multiplex CARS scheme does not employ a wavelength-tunable laser light source but employs a light source that simultaneously generates laser radiations with a broad wavelength bandwidth. Generally, a broadband laser beam is used to serve as a Stokes beam for generating broadband multiplex CARS signals. Since the generated CARS signal contains multiplexed spectral components, a monochromator or spectrometer for separating and detecting respective spectral signal components is usually employed in the 2-color multiplex CARS spectrometer.

For a broadband laser light source used to implement the 2-color multiplex CARS spectrometer, the output wavelength band must be longer than the wavelength of a laser beam that serves as a pump beam so as to serve as a Stokes beam, based on the principle of a CARS signal generation (see FIG. 3). When the aforementioned condition is satisfied, a multiplex CARS spectrum to be generated permits a spectral resolution defined by the linewidth of a pump laser beam at a fixed wavelength (see 4(b)). On the contrary to the aforementioned condition, if the broadband laser source operates in a shorter wavelength band, the broadband laser beam simultaneously serves as a pump beam and a probe beam. In turn, multiplex CARS spectral signals that are mixed in wavelength components by the spectral convolution result in to blur the original CARS spectrum (see FIG. 4(b)).

In principle, the combination of a broadband laser light source and a fixed wavelength laser source having a narrow linewidth, which are required to construct the 2-color multiplex CARS spectrometer, may be implemented in various ways. However, in the application of the multiplex CARS spectroscopy to biological samples, laser light sources for the 2-color multiplex CARS spectrometer should preferably operate in the near IR region with wavelength over 700 nm so as to avoid undesired laser-sample interactions other than the CARS process. Particularly, when observing turbid media such as biological tissues, the depth to which a laser beam is transmitted into the turbid media can be increased as the wavelength is lengthened. Therefore, selecting the wavelength of the laser light source is an important technical issue to be considered.

Generally, the Raman shift to be covered in the CARS spectroscopy lies in the range from 500 to 4000 $cm^{-1}$. When the laser beam of a short wavelength, which serves as a pump beam, operates at a wavelength of over 700 nm, the broadband laser beam that serves as a Stokes beam must operate at a wavelength of over 950 nm. Practically, ultrashort pulse laser light sources capable of broadband lasing at these wavelengths are not easily available to date. As an alternative approach, there is a method using a super-continuum white-light beam generated from a photonic crystal fiber.

The super-continuum white-light beam may be generated by injecting a Ti:Sapphire femtosecond laser beam or neodimuim (Nd) gain medium modelocked picosecond laser beam into a photonic crystal fiber having a high nonlinearity. Here, the Ti:Sapphire femtosecond laser beam usually has its center wavelength near 800 nm where high power output can be achieved, and the Nd gain medium modelocked picosecond laser beam has a center wavelength of 1064 nm. A conversion of such laser light into broadband radiation can be used for a Stokes beam in the multiplex CARS spectroscopy. However, total conversion efficiency is often very low (below 5%), and it is technologically difficult to obtain a stable output spectrum having a uniform spectral shape. Fundamentally, the output power of an incident laser beam should be regulated due to the optical damage threshold of the photonic crystal fiber, and therefore, it is difficult to obtain a Stokes beam having a sufficient output required in the multiplex CARS spectroscopy. Consequently, if a Stokes beam having the aforementioned characteristics is employed, it takes a long time to obtain a multiplex CARS spectrum, and the signal-to-noise ratio of a spectrum is unwantedly low. Further, a careful spectrum normalization procedure is also necessary for quantitative measurements.

Therefore, an alternative scheme is required in order to use a broadband ultrashort pulse laser light source having a center wavelength near 800 nm which provides a stable and sufficient power output at the level of state-of-the-art technology. That is, it is required to develop an effective multiplex CARS spectroscopy, in which a broadband laser beam having a short wavelength is used as a pump beam, and a stable laser beam having a relatively long wavelength serves as a Stokes beam.

DISCLOSURE OF THE INVENTION

It is an object of the present invention to provide a 3-color multiplex CARS spectrometer, wherein the multiplex CARS spectroscopy is implemented using a broadband laser beam of a short wavelength for a pump beam, thereby solving problems of the conventional 2-color excitation CARS scheme in which wavelength decomposition necessary for spectral resolution is not possible with broadband pump light.

It is another object of the present invention to provide an optical system to generate, collect, and process multiplex CARS signals, which is required in implementing a practical CARS microscopic imaging system.

To achieve these objects of the present invention, in the 3-color multiplex CARS spectrometer, Raman resonance is achieved for multiple molecular vibrations of a sample by the combination of a short-wavelength pump beam generated by a broadband laser light source and a long-wavelength Stokes beam generated by a stable laser light source, and another short-wavelength laser beam having a narrow linewidth is then introduced separately to serve as a probe beam that interacts with the laser-driven sample, thereby generating CARS spectral signals whose wavelength components can be resolved.

Figure 6:
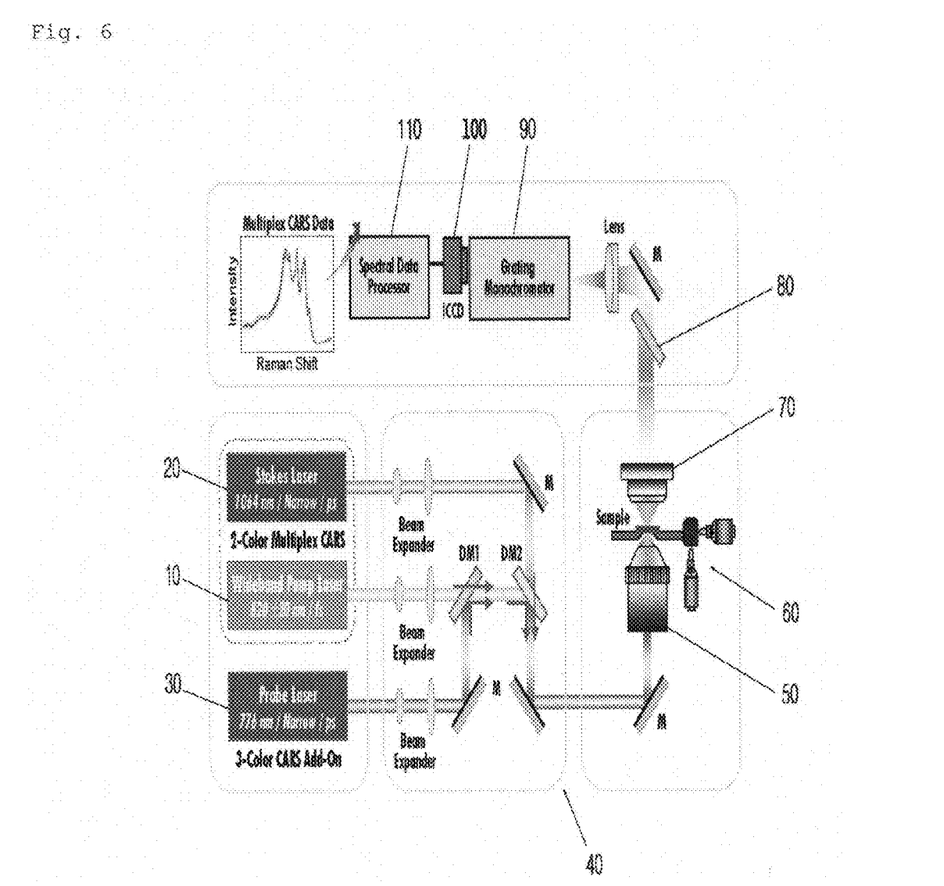
FIG. 6 is a diagram showing the configuration of a spectrometer using a newly proposed 3-color multiplex CARS spectroscopy according to the present invention.

According to the aspects of the present invention, there is a 3-color multiplex CARS spectrometer, which includes: a broadband laser light source 10 generating a pump beam for multiply exciting molecular vibration of media constituting a sample; a Stokes laser light source 20 generating a Stokes beam to interact with the pump beam for making the multiply excited molecular vibration into resonance; a probe laser light source 30 generating a probe beam for generating a multiplex CARS spectrum signal from the resonantly excited molecular vibrations of the sample; a beam combiner 40 for spatial overlapping of the temporally synchronized optical pulse outputs of the pump, Stokes and probe beams along the same axis; a microscope objective 50 focusing the temporally and spatially synchronized laser beam on a point in the sample; a sample displacement scanner 60 arbitrarily adjusting the position of a focus of the laser beam in the sample focused by the microscope objective 50; a condensing optical system 70 collecting and collimating a CARS signal generated at the focus of the sample; a dichroic mirror 80 or notch filter removing the excitation laser wavelength components and optical noises contained in the collected CARS signal; a monochromator 90 spatially dispersing wavelength components of the pure CARS signal from which the noise wavelength components are removed; a 1D/2D photodetector array 100 detecting a multiplex CARS spectral signal which is wavelength-dispersed by the monochromator 90; and a data analyzer 110 transferring the wavelength-dispersed multiplex CARS spectral signal detected by the 1D/2D photodetector array 100 to a computer and performing data analysis.

The data analyzer may perform a processing of the multiplex CARS spectrum to normalize the measured CARS spectrum to a non-resonant CARS spectrum, which takes into account the non-uniform spectral intensity distribution of incident laser beams.

The 1D/2D photodetector array may include a 1- or 2-dimensional ICCD or EMCCD having excellent quantum efficiency and signal-to-noise ratio.

The multiplex CARS spectrometer may be simultaneously implemented by being combined with a conventional fixed-wavelength CARS microscopic imaging device.

As described above, the present invention provides a 3-color multiplex CARS spectroscopy, thereby solving theoretical and technical problems caused by the conventional 2-color multiplex CARS spectroscopy.

That is, a broadband near-IR ultrashort pulse laser beam that provides a stable and sufficient output at the level of state-of-the-art technology can be used as a pump beam, which obviates the requirement of using a broadband laser beam to serve as a Stokes beam at a longer wavelength than that of the pump beam. Further, a probe laser beam according to the present invention is separately added at the properly chosen wavelength, thereby preventing the problem of CARS spectrum distortion which is theoretically unavoidable in the conventional 2-color multiplex CARS scheme.

Furthermore, the present invention constitutes a multiplex CARS signal generating, condensing and processing optical system to be combined with the high-speed imaging method based on the conventional 2-color CARS microscope, thereby remarkably improving the molecular selectivity of the fixed-wavelength CARS imaging and the ability of molecular vibrational analysis in the technical field of a nonlinear spectral microscope using the CARS phenomenon.

BRIEF DESCRIPTION OF THE DRAWINGS

The patent or application file contains at least one drawing executed in color. Copies of this patent or patent application publication with color drawings will be provided by the office upon request and payment of the necessary fee.

DETAILED DESCRIPTION OF MAIN ELEMENTS

10: broadband laser light source
20: Stokes laser light source
30: probe laser light source
40: beam combiner
50: microscope objective
60: sample displacement scanner
70: condensing optical system
80: dichroic mirror
90: monochromator
100: 1D/2D photodetector array
110: data analyzer

BEST MODE FOR CARRYING OUT THE INVENTION

Hereinafter, a 3-color multiplex CARS spectrometer according to the present invention will be described in detail with reference to the accompanying drawings.

Figure 5:
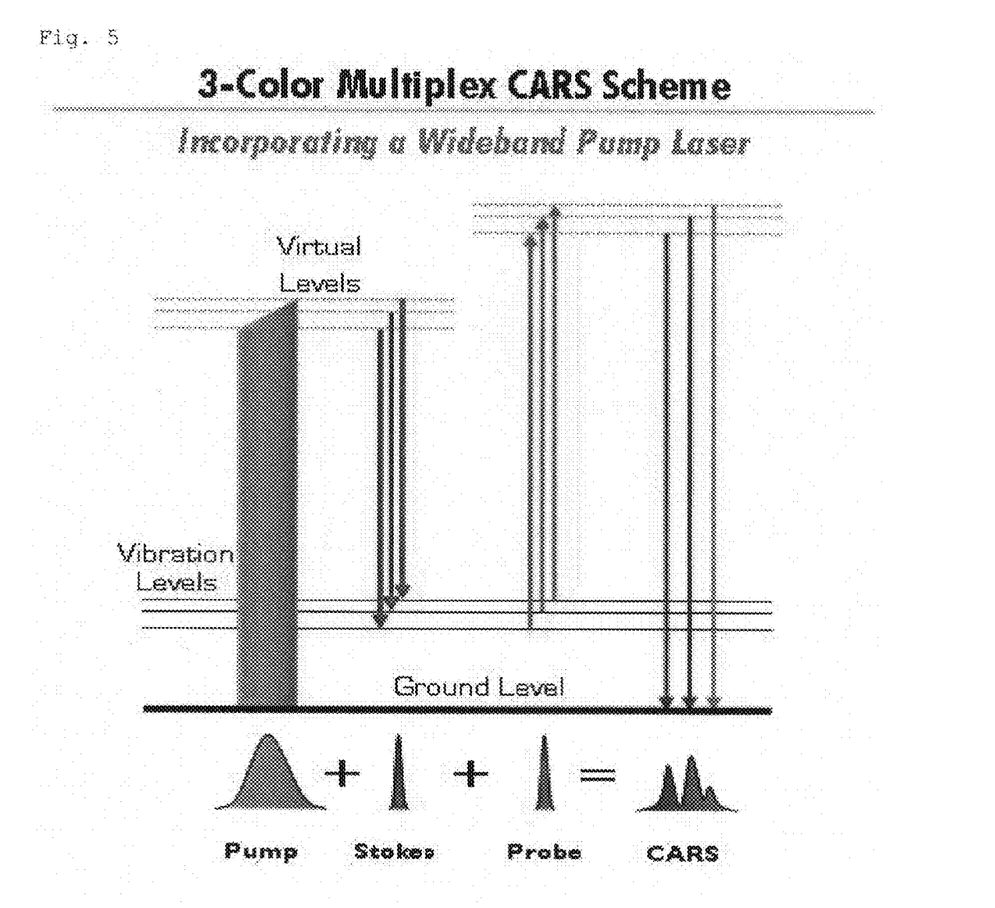
FIG. 5 is a diagram showing molecular vibrational energy levels and transitions in the 3-color multiplex CARS spectroscopy according to the present invention.

FIG. 5 is a diagram showing molecular vibrational energy levels and transitions in the 3-color multiplex CARS spectroscopy according to the present invention, and FIG. 6 is a diagram showing the configuration of a spectrometer using a newly proposed 3-color multiplex CARS spectroscopy according to the present invention.

In order to obtain a broadband molecular vibrational spectrum of a sample, the multiplex CARS spectrometer uses 3-color light source system consisting of 3 individual laser light sources having different oscillation frequency or wavelength characteristics, i.e., a broadband laser light source 10 generating a pump beam for multiply exciting the molecular vibrations of specific media constituting the sample; a Stokes laser light source 20 generating a Stokes beam for allowing the multiply excited molecular vibrations to resonate while interacting with the pump beam; and a probe laser light source 30 generating a probe beam for generating a multiplex CARS spectrum signal from the resonantly excited molecular vibration of the sample. That is, a broadband (frequency range: $\Delta\omega_{pmp}$) laser beam having a center frequency of $\omega_{pmp}$, a long-wavelength Stokes laser beam having a frequency of $\omega_{stk}$, and a short-wavelength probe laser beam having a frequency of $\omega_{prb}$ are used to generate a CARS spectral signal (see FIG. 5). When assuming that the frequency of light is $\omega$, the frequency of light is $\lambda$, and the speed of light is c, they satisfy a relation, $\omega = 2\pi c/\lambda$.

In the process of generating a CARS spectral signal, the combination of frequency components (a) $\omega'_{pmp}$) constituting the broadband (center frequency: $\omega_{pmp}$, bandwidth: $\Delta\omega_{pmp}$) pump beam and the Stokes beam (center frequency: $\omega_{stk}$) allows molecular vibrational energy levels ($E_v = (h/2\pi)(\omega'_{pmp} - \omega_{stk})$) of the media constituting the sample to be simultaneously excited in a wide range ($\Delta E_v = (h/2\pi)\Delta\omega_{pmp}$) through resonance interaction with the sample. In the conventional 2-color CARS spectroscopy in which a short-wavelength probe laser beam having a frequency of $\omega_{prb}$ is not separately incident, the broadband pump laser beam also serves as a probe beam in the process of generating a CARS spectral signal. Therefore, an anti-Stokes Raman scattering signal ($\omega_{AS} = (\omega'_{pmp} - \omega_{stk}) - \omega''_{pmp}$) is generated by a probe beam component (frequency: $\omega''_{pmp}$) convoluted as wide as the frequency bandwidth ($\Delta\omega_{pmp}$) of the pump beam from respective excited molecular vibrations (($\omega_v = (\omega'_{pmp} - \omega_{stk})$)). Consequently, a multiplex CARS spectral signal, which is impossible to be divided into wavelength components and rather convoluted as wide as the bandwidth of the pump beam, is generated to be overlapped with each other throughout a range from the minimum frequency ($\omega_{AS,Min} = (2\omega_{pmp} - \omega_{stk}) - \Delta\omega_{pmp}$) to the maximum frequency ($\omega_{AS,Max} = (2\omega_{pmp} - \omega_{stk}) + \Delta\omega_{pmp}$) (See FIG. 4(b)).

On the contrary, a short-wavelength laser beam having a frequency of $\omega_{prb}$, which serves as a probe beam having a narrow linewidth, is additionally incident according to the 3-color multiplex CARS spectroscopy of the present invention (see FIG. 5), thereby obtaining a well-defined multiplex CARS spectrum in which wavelength decomposition is possible with a high resolution (see FIG. 4(c)). That is, a multiplex CARS signal having a frequency of $\omega_{AS} = (\omega'_{pmp} - \omega_{stk}) - \omega_{prb}$ is generated throughout a range from the minimum frequency ($\omega_{AS,Min} = [(\omega_{pmp} - \omega_{stk}) + \omega_{prb}] - \Delta\omega_{pmp}/2$) to the maximum frequency ($\omega_{AS,Max} = [(\omega_{pmp} - \omega_{stk}) + \omega_{prb}] + \Delta\omega_{pmp}/2$) without frequency overlapping of respective molecular vibrational components.

When implementing the 3-color multiplex CARS spectroscopy, the frequency of a laser beam that serves as the probe beam should be appropriately selected. Practically, a 3-color multiplex CARS spectrum and a 2-color multiplex CARS spectrum are simultaneously generated when a multiplex CARS signal is generated. For this reason, the 3-color multiplex CARS spectrum used in a high-resolution CARS spectral analysis should not be overlapped with the 2-color multiplex CARS spectrum. To this end, the minimum frequency in the region of the 3-color multiplex CARS spectrum is set to be greater than the maximum frequency in the region of the 2-color multiplex CARS spectrum. When conditions of a broadband pump beam (center frequency: $\omega_{pmp}$, bandwidth: $\Delta\omega_{pmp}$) are given, it is essential that the frequency ($\omega_{prb}$) of a probe beam should be at least ($\omega_{pmp} + 3\Delta\omega_{pmp}/2$) or larger.

In order to implement the multiplex CARS spectroscopy based on the nonlinear Raman scattering phenomenon, the 3-color laser light source system that satisfies the aforementioned frequency conditions preferably has output characteristics of a repetitive pulse with high peak intensity, and is controlled with a high precision (within the time width of a laser pulse) by a optical/mechanical device, i.e., a synchronizer performing temporal synchronization so that all the respective laser beams have the same repetition rate and timing. The synchronizer may be combined with an active or passive device and include a master-slave laser pulse train synchronizer or an optical pulse delay generator.

A CARS signal is effectively generated when all excitation laser beams are spatially focused on one position in an interior of a sample. Therefore, the synchronized laser beams of the 3-color pulse laser system are combined through an additional device that equalizes the lateral dimension and divergence of the beams while the positions and directions of the beams are spatially overlapped with one another on the same axis. The additional device includes a beam expander positioned on a path of the pump, Stokes and probe beams, and a beam combiner 40 spatially combining the pump, Stokes and probe beams on the same axis without power loss.

The beam combiner 40 includes a combination of dichroic mirrors having opposite reflection and transmission characteristics between laser beams having different frequency bands. As an example, two laser beams are spatially combined by a dichroic mirror that reflects the probe laser beam having the shortest wavelength and transmits the broadband pump laser beam having a relatively longer wavelength than that of the probe laser beam (see FIG. 6). Then, all the laser beams are spatially combined by passing through a dichroic mirror that reflects both of the probe laser beam and broadband pump laser beam, which have been spatially combined, and transmits the Stokes laser beam having the longest wavelength.

An output laser beam of the 3-color laser system, which is spatially combined by the beam combiner 40, is focused on a point in a sample through a microscope objective 50 positioned in front of the sample. The laser beams tightly focused at the focal point of the microscope objective 50 interact with molecular vibrations of a substance constituting the sample and generates a multiplex CARS signal in the forward direction. At this time, a sample displacement scanner 60 is used to adjust the point on which the laser beam is focused by the microscope objective 50.

The sample displacement scanner 60 includes a manual, motorized or piezoelectric-transducer mechanical translator that allows the position in the sample from which a multiplex CARS signal is generated to be arbitrarily designated by changing the laser focus in the sample focused by the microscope objective 50 on the XY plane and/or in the direction of the optical axis (Z-axis).

The multiplex CARS signal generated at the laser focus in the sample is condensed and collimated by a condensing optical system 70. Incident laser components unnecessary for spectral analysis could exist together with the condensed multiplex CARS signal. Therefore, the incident laser components having different wavelengths from the wavelength band of the multiplex CARS signal are removed using a dichroic mirror 80 or notch filter. A monochromator 90 using a wavelength dispersion element such as a grating or prism, that allows wavelength components of the CARS signal to be spatially dispersed, is used to obtain a spectrum of the filtered pure multiplex CARS signal. The multiplex CARS spectral signal is wavelength-dispersed at an output terminal of the monochromator 90 and then detected by a 1D/2D photodetector array 100.

The 1D/2D photodetector array 100 includes any one selected from the group consisting of a 1- or 2-dimensional charge coupled device (CCD), a cooled CCD, an intensified CCD and an EMCCD having excellent quantum efficiency and signal-to-noise ratio.

The wavelength-dispersed CARS spectral signal obtained by the 1D/2D photodetector array 100 is transferred to a data analyzer 110 and then analyzed. The data analyzer finally extracts a multiplex CARS spectrum through a quantitative correction process including spectral intensity, normalization and Raman shift.

The multiplex CARS spectrum is measured depending on a spatial position of the sample, thereby obtaining microscopic images. To this end, the sample displacement scanner 60 is used to raster scan the position of a laser beam focus in the sample. The sample displacement scanner of the present invention preferably includes a fast motorized stage that translates the position of a sample in the direction of the XY plane and the Z-axis, or a galvano mirror scanner that raster scans the focus of the spatio-temporally combined laser beam on a 2-dimensional plane within the sample at a high speed. The multiplex CARS spectrometer operated as described above may be used in a high-resolution molecular vibrational microscope.

When implementing the multiplex CARS spectroscopy, the present invention employs a 3-color laser light source system in which a short-wavelength probe beam is added to use a broadband laser beam as a pump beam, thereby performing high-resolution multiplex CARS spectral measurement and molecular vibrational microscopic imaging.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A 3-color multiplex CARS spectrometer, comprising:
    a broadband laser light source 10 generating a pump beam for multiply exciting molecular vibrations of media constituting a sample;
    a narrowband Stokes laser light source 20 generating a Stokes beam for allowing the multiply excited molecular vibration to resonate while interacting with a separate pump beam whose wavelength band is arbitrarily set and is different from the pump beam;
    a probe laser light source 30 generating a probe beam for generating a multiplex CARS spectrum signal from the resonance-excited molecular vibration of the sample, wherein the probe laser light source 30 uses a short-wavelength laser beam having a shorter wavelength than that of the pump beam so that a 3-color multiplex CARS spectral signal generated using the pump, Stokes and probe beams is separated from a distorted 2-color multiplex CARS spectral components generated using only the combination of the pump and Stokes beams;
    a beam combiner 40 temporally synchronizing optical pulse outputs of the pump, Stokes and probe beams, and spatially overlapping the pump, Stokes and probe beams on the same axis;
    a microscope objective 50 focusing the synchronized and spatially overlapped laser beam onto a point in the sample;
    a sample displacement scanner 60 arbitrarily adjusting the position of a focus of the laser beam in the sample focused by the microscope objective 50;
    a condensing optical system 70 condensing and collimating a CARS signal generated at the focus of the sample;
    a dichroic mirror 80 or notch filter removing the incident laser and noise wavelength components contained in the condensed CARS signal;
    a monochromator 90 spatially dispersing wavelength components of the pure CARS signal from which the incident laser and noise wavelength components are removed;
    a 1D/2D photodetector array 100 detecting a multiplex CARS spectral signal wavelength-dispersed by the monochromator 90; and
    a data analyzer 110 transferring the wavelength-dispersed multiplex CARS spectral signal detected by the 1D/2D photodetector array 100 to a computer and performing data analysis.

2. The 3-color multiplex CARS spectrometer as set forth in claim 1, wherein the sample displacement scanner 60 includes a manual, motorized or piezoelectric-transducer mechanical translator that allows the position in the sample from which a multiplex CARS signal is detected to be arbitrarily designated by changing the laser focus in the sample focused by the microscope objective 50 in the direction of the XY plane and the optical axis (Z-axis).

3. The 3-color multiplex CARS spectrometer as set forth in claim 1, wherein the monochromator 90 uses a grating or prism as a wavelength dispersion element so as to allow the wavelength components of the CARS signal to be spatially dispersed.

4. The 3-color multiplex CARS spectrometer as set forth in claim 1, wherein the 1D/2D photodetector array 100 includes any one selected from the group consisting of a 1- or 2-dimensional charge coupled device (CCD) having a high sensitivity and a low noise level, a cooled CCD, an intensified CCD and an EMCCD.

5. A 3-color multiplex CARS spectral microscope, wherein the 3-color multiplex CARS spectrometer according to claim 1 is used in a microscopic imaging device.

6. A 3-color multiplex CARS spectral microscope, wherein the 3-color multiplex CARS spectrometer according to claim 2 is used in a microscopic imaging device.

7. A 3-color multiplex CARS spectral microscope, wherein the 3-color multiplex CARS spectrometer according to claim 3 is used in a microscopic imaging device.

8. A 3-color multiplex CARS spectral microscope, wherein the 3-color multiplex CARS spectrometer according to claim 4 is used in a microscopic imaging device.

* * * * *